July 4, 1950 W. V. THELANDER 2,513,378
AUTOMATIC CLUTCH
Filed May 17, 1944 2 Sheets-Sheet 1

Inventor
W. Vincent Thelander
Atty.

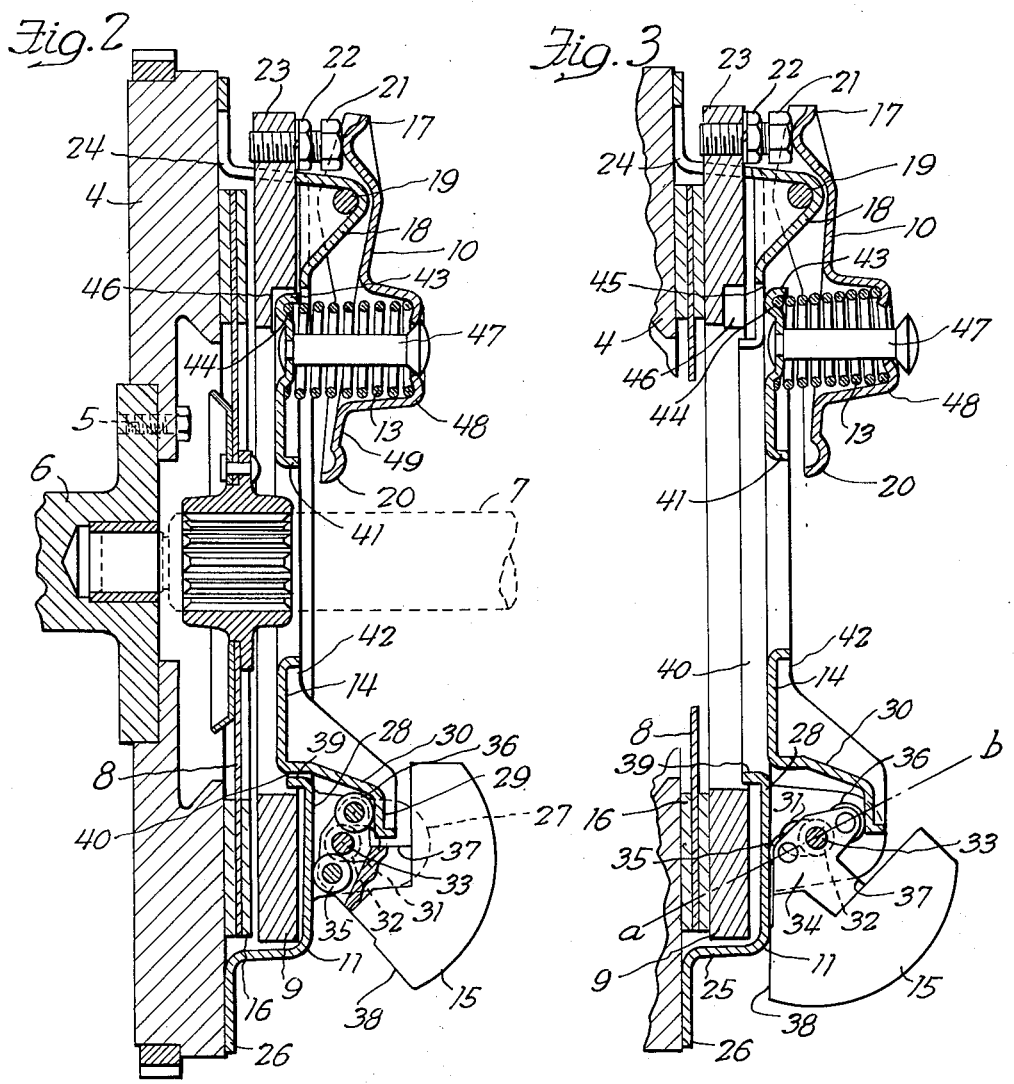

Patented July 4, 1950

2,513,378

UNITED STATES PATENT OFFICE 2,513,378

AUTOMATIC CLUTCH

W. Vincent Thelander, Auburn, Ind., assignor to Dana Corporation, Toledo, Ohio, a corporation of Virginia Application May 17, 1944, Serial No. 535,910

21 Claims. (Cl. 192—105)

This invention relates to automatic clutches for automotive use generally, and is more particularly concerned with an automatic clutch embodying the features disclosed in Patent #1,985,301, issued December 25, 1934, in which I am a co-inventor.

The clutch disclosed in the aforesaid patent has a separate spring for each pressure-transmitting lever, disposed in such a way that the lever multiplies the pressure of the spring to insure positive engagement of the clutch, although the springs are disposed so that there is a certain mechanical advantage in the operation of the levers in overcoming the action of the springs in the disengagement of the clutch, whereby to have light pedal action. The principal object of the present invention is to provide an automatic clutch utilizing the novel feature just mentioned, and including a spring loading ring in combination with the plurality of levers and their springs, arranged to be moved in the spring loading direction by means of a plurality of centrifugal fly-weights.

Another object of my invention is to provide an automatic clutch of the kind mentioned, in which the centrifugal fly-weights are slidably, pivotally mounted on the back plate which, of course, turns with the fly-wheel, the fly-weights, in swinging outwardly under centrifugal force, transmitting movement to the spring loading ring.

Another object is to provide an automatic clutch of the kind mentioned, in which the fly-weights have cross-head portions on their pivoted inner ends for transmitting movement to the spring loading ring, and the swinging movement of the fly-weights is positively limited by engagement with the back plate when the cross-head portions are still sufficiently removed from a dead-center position with respect to the spring loading ring, so that the pressure of the springs can be and is utilized in returning the fly-weights to retracted position.

Still another object is to provide an automatic clutch of the kind mentioned, in which the spring loading ring is of small diameter and operates in the central opening provided in the back plate, it being disposed in front of the pressure-transmitting levers and having rearwardly extending, radially projecting portions to cooperate with the cross-head portions of the fly-weights, whereby to obtain the desired compactness, very little more space being required for this automatic clutch than is required for the non-automatic clutch of the aforesaid patent.

The invention is illustrated in the accompanying drawings, in which:

Fig. 2 is a cross-section on the broken line 2—2 of Fig. 1, showing the clutch disengaged, and Fig. 3 is a similar, but fragmentary, section, showing the clutch engaged.

The same reference numerals are applied to corresponding parts throughout these views.

Figure 1:
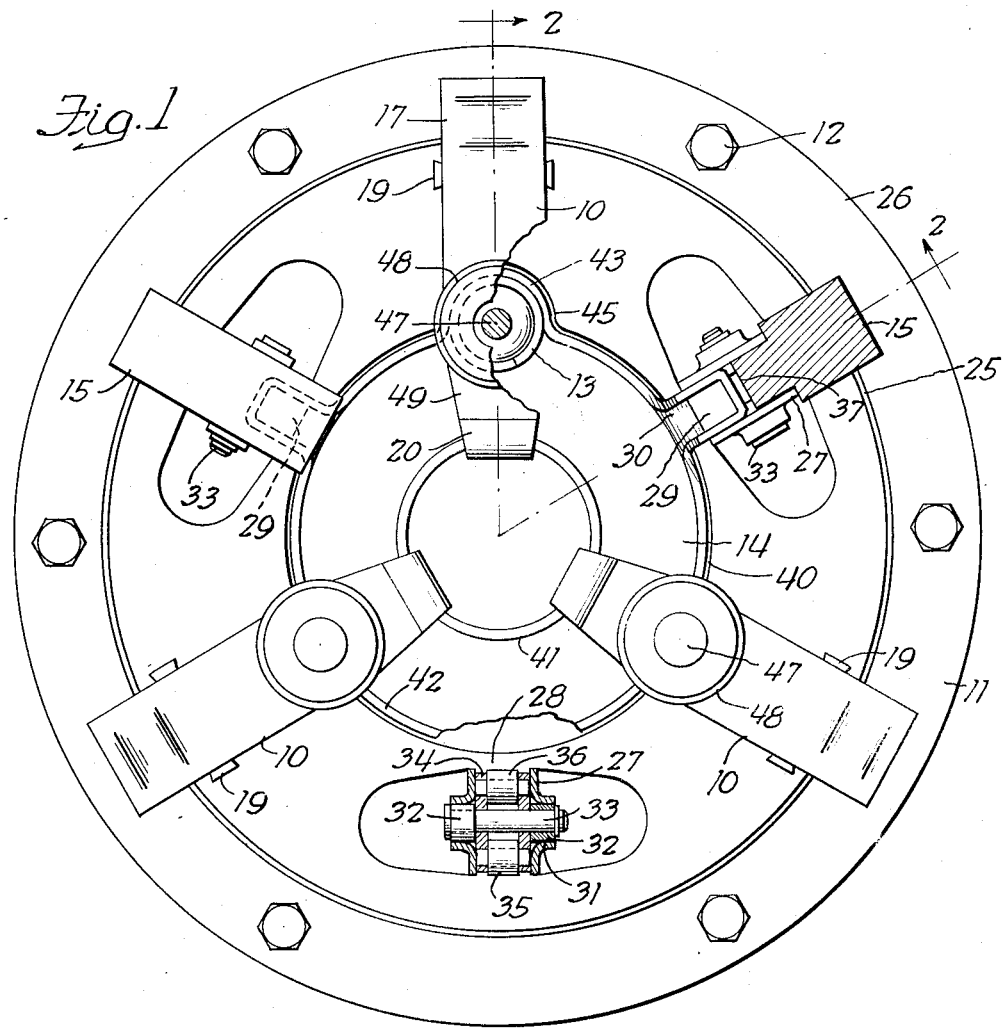
Fig. 1 is a rear view of an automatic clutch embodying my invention.

Referring to the drawings, the reference numeral 4 designates a fly-wheel mounted in the usual way, as indicated at 5, on the rear end of the engine crankshaft 6, whereby to constitute the driving element. A shaft, indicated at 7, constitutes the driven element and extends rearwardly into the gear box of the transmission, there being a housing about the fly-wheel and clutch assembly at the front end of the gear box, as is well known. The clutch comprises a disc 8, carried on a hub splined on the front end of the shaft 7 in the usual way, and a pressure plate 9 arranged to engage the disc 8 with the fly-wheel 4. In the ordinary, conventional, non-automatic clutch, a plurality of springs is provided, acting between the pressure plate and a back plate bolted onto the rim of the fly-wheel, normally to keep the clutch firmly engaged, and levers are provided, acting between the pressure plate and the back plate to disengage the clutch against the action of the springs. In the present case, however, a plurality of pressure-transmitting levers 10 is mounted on a back plate 11 bolted as indicated at 12, to the fly-wheel 4, and there are coiled compression springs 13 acting between the levers 10 and a spring loading ring 14, to urge the levers in the proper direction to apply pressure to the pressure plate 9 to frictionally engage the disc 8 between the pressure plate and the fly-wheel. In the earlier patent mentioned, the springs 13 were supported on seats provided on brackets carrying the levers 10, but in the present automatic clutch, these stationary spring seats are eliminated, and the spring loading ring 14 is provided, arranged to be moved in the spring loading direction by the outwardly swingable, centrifugal fly-weights 15, whereby automatically to cause engagement of the clutch when the engine is speeded up to a predetermined extent above idling speed. The usual pads or facings 16 are provided on the opposite sides of the disc 8 around the margins thereof, to give the desired engagement on the back face of the fly-wheel and the front face of the pressure plate. Each of the levers 10 is pivoted near its outer end 17 on an embossed portion 18 of the back plate 11, as at 19, and the spring 13, cooperating with the lever, is disposed so as to be active against the lever near its inner end 20, whereby to secure the desired pressure multiplication and tend toward more positive engagement of the clutch, as described in the earlier patent. While the pressure of the springs is multiplied through the levers, it is nevertheless apparent that there is a certain mechanical advantage obtained also in the disengagement of the clutch, inasmuch as the levers are operable at their inner ends 20 by means of the usual throw-out collar (not shown) by depression of the clutch pedal, and, of course, with this mechanical advantage a lighter pedal action is obtained. As pointed out in the earlier patent, another advantage of this location of the springs 13 in closely spaced relation to the pivots 19 for the levers 10 is that there is very little loss of spring pressure when the clutch facings 16 become worn, whereas, if the springs were disposed at the inner ends of the levers, there would be appreciable expansion of the springs resulting from slight wear of the clutch facings and, consequently, considerable loss of spring pressure. This is equally important in the present automatic clutch because, as will soon appear, the fly-weights are capable of moving the spring loading ring 14 only through a fixed distance, and hence the springs 13 will be thereby loaded only to a predetermined, limited extent. It should be clear in Fig. 3 that, regardless of the fact that the engine is running at a speed sufficient to cause automatic engagement of the clutch, the clutch may be disengaged by depression of the clutch pedal. The levers 10 under those conditions compress the springs 13 slightly beyond the extent illustrated in Fig. 3, and the pressure plate 9 is then free to float away from the fly-wheel so as not to transmit drive any longer to the clutch disc 8. A bolt 21 is threaded in the pressure plate 9 adjacent the outer end 17 of each of the levers 10, and has the head end thereof disposed for engagement by the end of the lever, as shown, whereby to transmit pressure to the plate for the engagement of the clutch. A lock nut 22 is provided on each of these bolts to jam against the back of the pressure plate and thus hold the bolt in adjusted condition. These bolts 21 are received in radially projecting lugs 23 formed on the pressure plate 9 and projecting through slots 24 provided therefor in the peripheral wall 25 of the back plate. The back plate, being bolted by its annular flange 26 at 12 to the fly-wheel, serves to transmit drive to the pressure plate by virtue of the engagement of the lugs 23 in the slots 24, so that the pressure plate turns with the fly-wheel as a unit, the slots 24 being elongated so as to permit the lugs 23 to slide back and forth therein to the extent required in the engagement and disengagement of the clutch.

The back plate 11 is stamped from a single piece of sheet metal to the dished form shown, and has the embossed portions 18 for support of the levers 10 struck therefrom in equally circumferentially spaced relation. Pairs of parallel ears 27 are also preferably punched out of the back wall 28 of the back plate at points in equally circumferentially spaced relation, midway between the bosses 18, to provide slidable, pivotal support for the fly-weights 15 and also to provide guides between these ears for the radially projecting portions 29 provided on the rearwardly projecting portions 30 of the spring loading ring 14. The ears 27 have registering elongated slots 31 provided therein to accommodate rollers 32 that are mounted on the ends of cross-pins 33 which extend through registering holes in the middle of the forked cross-head portions 34 formed on the inner ends of the fly-weights 15. Two rollers 35 and 36 are mounted in each of the forked cross-heads 34 on opposite sides of the cross-pins 33, rollers 35 to roll on the back of the back wall 28 of the back plate, and the rollers 36 on the front of the radially projecting portions 29 of the spring loading ring, as illustrated in Figs. 2 and 3. The fly-weights are notched out on their inner side, as shown at 37, to provide operating clearance for the radially projecting portions 29 of the spring loading ring, one-half of the cross-head portion 34 on the inner ends of the fly-weights forming the one side of these notches, so that the radially projecting portions 29 of the ring 14 are disposed in direct operative relationship to the cross-heads for movement of the ring 14 automatically in response to a predetermined increase in the speed of rotation of the fly-wheel above idling speed of the engine. It is important to note in Fig. 3 that the front face 38 of the fly-weights strikes the back wall 28 of the back plate to limit outward swinging movement of the fly-weights under centrifugal force, but when the fly-weights are in that extreme position, the rollers 35 and 36 are disposed with their centers on the line $ab$ that is inclined at an acute angle with respect to the back wall of the back plate, the centers of the rollers 36 being spaced radially inwardly with respect to the centers of the cross-pins 33, and the centers of the rollers 35 being spaced radially outwardly with respect to the centers of the cross-pins 33. As a result, the pressure of the springs 13 can be and is utilized for returning the fly-weights 15 to the retracted position shown in Fig. 2, and to hold the same normally in that position until the engine speed is increased to a predetermined extent above idling speed. The springs 13, in other words, serve a double function: they clamp the clutch disc between the fly-wheel and pressure plate under spring pressure through the medium of the levers 10, and they also tend normally to hold the fly-weights in retracted position and to return the same to retracted position when swung outwardly under centrifugal force, even to the extreme position shown in Fig. 3.

The back plate 11 has an annular flange 39 defining a substantially circular central opening 40, and the spring loading ring 14 is of substantially circular form, and small enough in radius to operate in the opening 40, as clearly appears in Figs. 2 and 3. In that way, I am enabled to place the ring 14 in front of the levers 10 and accordingly obtain the compact assembly shown. The ring 14 is stamped from sheet metal to substantially circular form and provided with inner and outer annular peripheral flanges 41 and 42 which make for maximum strength and rigidity. The rearwardly projecting arms 30, on which the radially projecting portions 29 are provided, are formed integral with the outer peripheral flange 42, and there are circumferentially spaced, peripherally projecting portions 43 on the ring, where the seats 44 for the springs 13 are provided, the back plate 11 being notched out, as indicated at 45, and the pressure plate 9 also being notched out, as indicated at 46, to provide clearance for these projections. Pins 47, suitably fixed at their one end on the ring 14, provide lost motion connections between the ring 14 and the embossed portions 48 of the levers 10, so that the springs are held caged between the ring 14 and levers 10 under a predetermined pre-load compression when the clutch is disengaged as shown in Fig. 2, but the ring is movable toward the levers under the action of the fly-weights 15, to cause engagement of the clutch and compress the springs 13 further and accordingly hold the clutch engaged under heavier spring pressure. The levers 10 are formed from sheet metal, as described in the earlier patent, being generally channel-shaped in cross-section for strength and rigidity, and the bosses 48 are struck from the web portion 49 of the levers.

In operation, it should be clear that, due to the pre-load compression of the springs 13, the levers 10 are moved in the direction of engaging the clutch in the initial outward pivotal movement of the fly-weights 15, and when the engine speed rises above the critical speed, the fly-weights move outwardly farther, and the springs 13 are accordingly compressed, causing the pressure plate 9 to hold the disc 8 engaged with the fly-wheel under a spring pressure above the pre-load pressure an extent depending upon the particular angularity of the fly-weights. The fly-weights, of course, move under restraint of the springs 13 and will not therefore assume the extreme position shown in Fig. 3 until the engine speed is sufficient for the centrifugal force to overcome the resistance of the springs to the extent indicated. It will therefore be apparent that in the normal acceleration of the engine, as between the shifting of gears, the springs 13 will be gradually compressed more and more up to the extreme condition illustrated in Fig. 3, so that the engagement of the clutch is proportionately smooth, and there is no tendency for grabbing. Assuming the clutch is engaged, as shown in Fig. 3, it should be clear that the pressure of the springs 13 is always active in the direction tending to return the fly-weights 15 to the retracted position shown in Fig. 2, due to the acute angularity of the cross-head portions 34 with respect to the back plate 11, as indicated by the line ab, passing through the centers of the rollers 35 and 36 and through the center of the cross-pin 33 therebetween. If the operator desires to disengage the clutch manually while it is automatically held engaged, he can do so by depression of the clutch pedal in the usual way so as swing the levers 10 against the resistance of the springs 13, out of engagement with the bolts 21 on the pressure plate 9.

It is believed the foregoing description conveys a good understanding of all of the objects and advantages of my invention. The appended claims have been drawn with a view to covering all legitimate modifications and adaptations.

I claim:

1. In a clutch comprising a driving element and a driven element, a pressure plate for holding the driving and driven elements frictionally engaged, a plurality of levers for communicating pressure to the pressure plate under spring pressure whereby to cause engagement of the clutch, supports for said levers carried by the driving element and each comprising a pivot for the lever near the outer end of the lever, said levers being manually operable in the opposite direction at their inner ends, a spring loading ring disposed in concentric relation to said pressure plate between the pressure plate and the inner end portions of the levers and adapted to be operatively associated directly with a plurality of compression springs that are to be loaded thereby, a plurality of centrifugal fly-weights turning with the driving element and pivoted relative thereto independently of the levers and arranged to move said loading ring in the spring loading direction when the driving element exceeds a predetermined speed of rotation, and a plurality of compression springs disposed between said loading ring and the levers, there being at least one spring active against each of said levers at a point between the pivot and the inner end of the lever, whereby pressure is applied in one direction to the pressure plate when the clutch is engaged and in the other direction to the fly-weights tending to return the latter to retracted position.

2. In a clutch comprising a driving element and a driven element, a pressure plate for holding the driving and driven elements frictionally engaged, a plurality of levers for communicating pressure to the pressure plate under spring pressure whereby to cause engagement of the clutch, supports for said levers carried by the driving element and each comprising a pivot for the lever near the outer end of the lever, said levers being operable manually at their inner ends, a spring loading ring disposed in concentric relation to said pressure plate between the pressure plate and the inner end portions of said levers, a centrifugal fly-weight turning with the driving element and pivoted relative thereto independently of the levers and arranged to move said spring loading ring in the spring loading direction when the driving element exceeds a predetermined speed of rotation, a plurality of compression springs disposed between said loading ring and the inner end portions of said levers adapted to apply pressure in one direction to said levers between their pivots and their inner ends for application of pressure to the pressure plate for engagement of the clutch and in the opposite direction to the spring loading ring to return the fly-weight to retracted position, and means cooperating with the loading ring and said springs to support the same on said levers and maintain the springs under a predetermined pre-load compression, whereby when the clutch is engaged it is engaged under increased spring pressure.

3. In a clutch comprising a fly-wheel constituting the driving element, and a clutch disk constituting the driven element, a pressure plate for holding the clutch disk frictionally engaged with the fly-wheel, a plurality of levers substantially radially disposed with respect to the fly-wheel and pivoted near their outer ends with respect to the latter for communicating movement to the pressure plate under spring pressure to cause engagement of the clutch, said levers being disposed in equally circumferentially spaced relation relative to the fly-wheel, a single set of coiled compression springs of which there is at least one active against each of said levers at a point between the pivot and the inner end of the lever for applying pressure to the pressure plate, the inner ends of said levers being manually operable to relieve pressure on the pressure plate, a spring loading ring disposed between the pressure plate and the inner end portions of said levers and bearing against all of said springs for compression thereof, and a plurality of centrifugal fly-weights mounted to turn with the fly-wheel and disposed in equally circumferentially spaced relation midway between and independently of the levers and arranged to move the aforesaid ring in the spring loading direction when the fly-wheel exceeds a predetermined speed of rotation, said fly-weights being arranged to move through a predetermined distance under centrifugal force and being subject in their extreme position to the pressure of said springs through the medium of the spring loading ring tending to return said weights to retracted position.

4. In a clutch comprising a driving element and a driven element, a pressure plate for holding the driving and driven elements frictionally engaged, a back plate, a plurality of levers pivoted near their outer ends on the back plate and having their outer ends arranged for communicating pressure to the pressure plate, a plurality of compression springs of which there is at least one active against each of said levers at a point between the pivot and the inner end of the lever for applying pressure to the pressure plate, said levers being manually operable in the opposite direction at their inner ends, a spring loading ring disposed between the pressure plate and the inner end portions of said levers and operatively associated with said springs, and a plurality of centrifugal fly-weights pivotally mounted on the back plate independently of the levers and arranged to swing outwardly under centrifugal force and move said ring in the spring loading direction when the driving element exceeds a predetermined speed of rotation.

5. In a clutch comprising a driving element and a driven element, a pressure plate for holding the driving and driven elements frictionally engaged, a back plate, a plurality of levers pivoted near their outer ends on the back plate and having their outer ends arranged for communicating pressure to the pressure plate, a plurality of compression springs of which there is at least one active against each of said levers at a point between the pivot and the inner end of the lever for applying pressure to the pressure plate, said levers being manually operable in the opposite direction at their inner ends, a spring loading ring disposed between the pressure plate and the inner end portions of said levers and operatively associated with said springs, means cooperating with said springs and said spring loading ring to support the same on said levers and maintain the springs under a predetermined pre-load compression, and a plurality of centrifugal fly-weights pivotally mounted on the back plate independently of the levers and arranged to swing outwardly under centrifugal force and move said ring in the spring loading direction when the driving element exceeds a predetermined speed of rotation to cause engagement of the clutch under increased spring pressure, said fly-weights being limited in their pivotal movement outwardly under centrifugal force and being subject in their extreme position to the pressure of said springs through the medium of the spring loading ring tending to return said weights to retracted position.

6. In a clutch comprising a driving element and a driven element, a pressure plate for holding the driving and driven elements frictionally engaged, a back plate, a plurality of levers pivoted near their outer ends on the back plate for communicating pressure to the pressure plate, compressible resilient means adapted to apply pressure to said levers whereby to apply pressure to the pressure plate for engagement of the clutch, a loading ring disposed in concentric relation to the pressure plate between the pressure plate and the inner end portions of said levers operatively associated directly with said resilient means and supported by said levers independently of the back plate, and a centrifugal fly-weight pivotally mounted on the back plate independently of the levers and arranged to swing outwardly under centrifugal force and move said loading ring in the loading direction when the driving element exceeds a predetermined speed of rotation.

7. In a clutch comprising a driving element and a driven element, a pressure plate for holding the driving and driven elements frictionally engaged, a back plate, a plurality of levers pivoted near their outer ends on the back plate for communicating pressure to the pressure plate, compressible resilient means adapted to apply pressure to said levers whereby to apply pressure to the pressure plate for engagement of the clutch, a loading ring disposed in concentric relation to the pressure plate between the pressure plate and the inner end portions of said levers operatively associated directly with said resilient means and supported by said levers independently of the back plate, means cooperating with said resilient means and said loading ring to support the same on said levers and maintain the resilient means under a predetermined pre-load compression, and a centrifugal fly-weight pivotally mounted on the back plate independently of the levers and arranged to swing outwardly under centrifugal force and move said loading ring in the loading direction when the driving element exceeds a predetermined speed of rotation to cause engagement of the clutch under increased pressure, said fly-weight being limited in its pivotal movement outwardly under centrifugal force and being subject in its extreme position solely to the pressure of said resilient means through the medium of the loading ring tending to return said weight to retracted position.

8. In a clutch comprising a flywheel constituting the driving element and a clutch disk constituting the driven element, a pressure plate for holding the clutch disk frictionally engaged with the flywheel, a back plate, a plurality of levers substantially radially disposed with respect to the flywheel and pivoted near their outer ends on the back plate for communicating movement to the pressure plate under spring pressure to engage the clutch, said levers being disposed in equally circumferentially spaced relation relative to the fly-wheel, a plurality of coiled compression springs of which there is at least one active against each of said levers at a point between the pivot and the inner end of the lever for applying pressure to the pressure plate, the inner ends of said levers being manually operable to relieve pressure on the pressure plate, a spring loading ring disposed between the pressure plate and the inner end portions of said levers and bearing against all of said springs for compression thereof, pins attached to and extending from the ring through the springs and the inner end portions of said levers to support the same on said levers and maintain the springs caged under a predetermined pre-load compression, said pins having heads on their free ends limiting endwise movement thereof relative to said levers in one direction, and a plurality of centrifugal fly-weights pivotally mounted on the back plate in equally circumferentially spaced relation midway between and independently of said levers and arranged to swing outwardly under centrifugal force to move the aforesaid ring in the spring loading direction when the flywheel exceeds a predetermined speed of rotation whereby to engage the clutch under increased spring pressure.

9. In a clutch, the combination of driving and driven members having surfaces adapted to engage, a pressure member for causing engagement of said surfaces, a plurality of pressure-transmitting levers pivotally supported near the outer ends thereof which are arranged to transmit pressure to the pressure member, a single set of springs active at one end against said levers, a spring loading element operatively associated with the other end of said springs and supported on the levers, and a centrifugal fly-weight turning with the driving member and having a pivotal cross-head portion slidably pivotally mounted relative thereto independently of the levers and so arranged relative to said driving member and spring loading element that when the weight swings outwardly under centrifugal force, said cross-head moves the spring loading element away from the driving member in the spring loading direction, said fly-weight being limited in its outward movement under centrifugal force so that the cross-head portion is disposed in acute angular relationship to the spring loading element, whereby the spring pressure of said springs is active through the spring loading element to return the fly-weight to retracted position solely under pressure of said springs.

10. In a clutch, the combination of driving and driven members having surfaces adapted to engage, a pressure member for causing engagement of said surfaces, a back plate, a plurality of pressure-transmitting levers pivotally supported on said back plate near the outer ends which are arranged to transmit pressure to the pressure member a single set of springs active at one end against said levers, a spring loading element disposed between the pressure member and the inner end portions of said levers and operatively associated with the other end of said springs and supported on said levers independently of the back plate, and a centrifugal fly-weight turning with the driving member and having a pivotal cross-head portion slidably pivotally mounted on the back plate independently of the levers and arranged to crowd the spring loading element toward said levers in the spring loading direction when the fly-weight swings outwardly under centrifugal force, said fly-weight being limited in its outward movement under centrifugal force by engagement with the back plate so that the cross-head portion is disposed in acute angular relationship to the spring loading element, whereby the spring pressure of said springs is active through the spring loading element to return the fly-weight to retracted position.

11. In a clutch comprising a driving element and a driven element, a pressure plate for holding the driving and driven elements frictionally engaged, a back plate, a plurality of levers for communicating pressure to the pressure plate under spring pressure, whereby to cause engagement of the clutch, supports for said levers on the back plate each comprising a pivot for the lever near the outer end of the lever, said levers being operable manually at their inner ends, spring means adapted to apply pressure to said levers whereby to apply pressure to the pressure plate for engagement of the clutch, a spring loading element operatively associated with said spring means, forked projections on the back plate slidably receiving therebetween peripheral portions of said spring loading element to guide the latter for movement toward and away from the back plate, and centrifugal fly-weights having pivotal cross-head portions slidably pivotally mounted in said forked projections and arranged by engagement at its opposite ends with the back plate and said peripheral portions of the spring loading element to force the latter away from the back plate in the spring loading direction when said weights swing outwardly under centrifugal force, said flyweights being urged inwardly to retracted position solely under pressure of the aforesaid spring means.

12. In a clutch comprising a driving element and a driven element, a pressure plate for holding the driving and driven elements frictionally engaged, a back plate, a plurality of levers for communicating pressure to the pressure plate under spring pressure whereby to cause engagement of the clutch, supports for said levers carried by the back plate each comprising a pivot for the lever near the outer end of the lever, said levers being operable manually at their inner ends, spring means adapted to apply pressure to said levers whereby to apply pressure to the pressure plate for engagement of the clutch, a spring loading element operatively associated with said spring means, projections on the back plate slidably guiding thereon weight actuated portions of said spring loading element for reciprocatory movement toward and away from the back plate, and centrifugal fly-weights having cross-head portions pivotally mounted on said projections between the back plate and said weight actuated portions of said spring loading element and arranged when said weights swing outwardly under centrifugal force to force said spring loading element away from said back plate in spring loading direction, said flyweights being urged inwardly to retracted position solely under pressure of the aforesaid spring means.

13. In a clutch comprising a driving element and a driven element, a pressure plate for holding the driving and driven elements frictionally engaged, a back plate, a plurality of levers for communicating pressure to the pressure plate under spring pressure whereby to cause engagement of the clutch, supports for said levers carried by the back plate each comprising a pivot for the lever near the outer end of the lever, said levers being operable manually at their inner ends, spring means adapted to apply pressure to said levers whereby to apply pressure to the pressure plate for engagement of the clutch, a spring loading element operatively associated with said spring means, projections on the back plate slidably guiding thereon weight actuated portions of said spring loading element for reciprocatory movement, and centrifugal flyweights having bell-crank shaped pivotal portions pivoted on said projections and arranged to engage said weight actuated portions of said spring loading element whereby to move the latter in spring loading direction when said weights swing outwardly uder centrifugal force said flyweights being urged inwardly to retracted position solely under pressure of the aforesaid spring means.

14. In a clutch, the combination of driving and driven members having surfaces adapted to engage, a pressure member for causing engagement of said surfaces, a back plate, a pressure-transmitting lever pivotally supported on the back plate near its outer end which is arranged to transmit pressure to the pressure member, spring means active at one end against said levers, a spring loading element operatively associated with the other end of said spring means, forked supports on the back plate for centrifugal flyweights, and centrifugal fly-weights having T-shaped end portions pivotally and slidably mounted by the middle portions of their T's in said forked supports, rollers on the opposite ends of said T's rollably engaging surfaces on the back plate and other surfaces on said spring loading element whereby to move the latter in spring loading direction when said weights swing outwardly under centrifugal force, said flyweights being urged inwardly to retracted position solely under pressure of the aforesaid spring means.

15. In a clutch comprising a driving element and a driven element, a pressure plate for holding the driving and driven elements frictionally engaged, a back plate, a plurality of levers for communicating pressure to the pressure plate under spring pressure whereby to cause engagement of the clutch, supports for said levers carried by the back plate each comprising a pivot for the lever near the outer end of the lever, a plurality of springs equal in number to the levers and each active against one of said levers at a point between the pivot and the inner end of the lever for applying pressure to the pressure plate, said levers being manually operable in the opposite direction at their inner ends, a spring loading ring in front of the inner end portions of said levers, pins extending from said ring through said springs and connected to the levers so as to cage said springs under a preload pressure, and a plurality of centrifugal fly-weights carried by the back plate and arranged to move said ring in the spring loading direction when the driving element exceeds a predetermined speed of rotation, said flyweights being urged inwardly to retracted position solely under pressure of the aforesaid springs.

16. In a clutch comprising a driving element and a driven element, a pressure plate for holding the driving and driven elements frictionally engaged, a back plate, a plurality of levers for communicating pressure to the pressure plate under spring pressure whereby to cause engagement of the clutch, supports for said levers carried by the back plate each comprising a pivot for the lever near the outer end of the lever, a plurality of springs equal in number to the levers and each active against one of said levers at a point between the pivot and the inner end of the lever for applying pressure to the pressure plate, said levers being manually operable in the opposite direction at their inner ends, a spring loading ring in front of the inner end portions of said levers, pins extending from said ring through said springs and connected to said levers so as to cage said springs under a preload pressure, a plurality of projections on the back plate having slidable guiding engagement with peripheral portions of said loading ring, and centrifugal fly-weights pivoted on said projections and having crank portions operatively engaging the peripheral portions of said loading ring to move the latter in spring loading direction when the fly-weights swing outwardly under centrifugal force, said flyweights being urged inwardly to retracted position solely under pressure of the aforesaid springs.

17. In a clutch comprising a driving element and a driven element, a pressure plate for holding the driving and driven elements frictionally engaged, a back plate, a plurality of levers disposed in circumferentially spaced relation with respect to said driving element for communicating pressure to the pressure plate to cause engagement of the clutch, said levers being pivotally supported near their outer ends on said back plate, a plurality of springs for applying pressure to the pressure plate through said levers, a spring loading ring operatively associated with said springs, and a plurality of centrifugal fly-weights pivotally mounted on the back plate in circumferentially spaced relation around the periphery of said ring, each weight being cut away on the inner side to receive a peripheral portion of said ring, one side of the cut-out defining an end portion of a cross-head on the pivoted end of the weight, said weight being slidably pivoted intermediate the ends of said cross-head relative to the back plate, whereby said cross-head acts to spread the ring away from the back plate in spring loading direction when the weight swings outwardly under centrifugal force, said flyweights being urged inwardly to retracted position solely under pressure of the aforesaid springs.

18. In a clutch comprising a driving element and a driven element, a pressure plate for holding the driving and driven elements frictionally engaged, a back plate, a plurality of levers disposed in circumferentially spaced relation with respect to said driving element for communicating pressure to the pressure plate to cause engagement of the clutch, said levers being pivotally supported near their outer ends on said back plate, a plurality of springs for applying pressure to the pressure plate through said levers, a spring loading ring operatively associated with said springs, and a plurality of centrifugal fly-weights pivotally mounted on the back plate in circumferentially spaced relation around the periphery of said ring, each weight being cut away on the inner side to receive a peripheral portion of said ring, one side of the cut-out defining a crank portion on the pivoted end of the weight adapted to force the ring away from the back plate in spring loading direction when the weight swings outwardly under centrifugal force, said flyweights being urged inwardly to retracted position solely under pressure of the aforesaid springs.

19. In a clutch comprising a fly-wheel constituting the driving element, and a clutch disk constituting the driven element, a pressure plate for holding the clutch disk frictionally engaged with the fly-wheel, a plurality of levers substantially radially disposed with respect to the fly-wheel and pivoted near their outer ends with respect to the latter and having their outer ends arranged for communicating movement to the pressure plate under spring pressure to cause engagement of the clutch, said levers being disposed in equally circumferentially spaced relation relative to the fly-wheel, coiled compression springs active against said levers for applying pressure to the pressure plate, the inner ends of said levers being manually operable to relieve pressure on the pressure plate, a spring loading ring cooperating with all of said springs for compression thereof, and a plurality of centrifugal fly-weights turning with the fly-wheel annd disposed in equally circumferentially spaced relation midway between and independently of the levers and arranged to move the aforesaid ring in the spring loading direction when the fly-wheel exceeds a predetermined speed of rotation, said fly-weights being arranged to move through a predetermined distance under centrifugal force and being subject in their extreme position to the pressure of said springs through the medium of the spring loading ring tending to return said weights to retracted position, said flyweights being urged inwardly to retracted position solely under pressure of the aforesaid springs.

20. In a clutch comprising a flywheel constituting the driving element and a clutch disk constituting the driven element, a pressure plate for holding the clutch disk frictionally engaged with the flywheel, a back plate, a plurality of levers substantially radially disposed with respect to the flywheel annd pivoted near their outer ends on the back plate and having their outer ends arranged for communicating movement to the pressure plate under spring pressure to engage the clutch, said levers being disposed in equally circumferentially spaced relation relative to the flywheel, a plurality of coiled compression springs active against said levers for applying pressure to the pressure plate, the inner ends of said levers being manually operable to relieve pressure on the pressure plate, a spring loading ring cooperating with all of said springs for compression thereof and carried on said levers through the medium of said springs, and a plurality of centrifugal flyweights pivotally mounted on the back plate in equally circumferentially spaced relation midway between and independently of said levers and arranged to swing outwardly under centrifugal force to move the aforesaid ring in the spring loading direction when the fly-wheel exceeds a predetermined speed of rotation, said flyweights being urged inwardly to retracted position solely under pressure of the aforesaid springs.

21. In a clutch comprising a driving element and a driven element, a pressure plate for holding the driving and driven elements frictionally engaged, a back plate, a plurality of levers pivoted near their outer ends on the back plate and having their outer ends arranged for communicating pressure to the pressure plate, a plurality of compression springs of which there is at least one active against each of said levers at a point between the pivot and the inner end of the lever for applying pressure to the pressure plate, said levers being manually operable in the opposite direction at their inner ends, a spring loading ring disposed between the pressure plate and the inner end portions of said levers and operatively associated with said springs, means cooperating with said springs and said spring loading ring to support the same on said levers and maintain the springs under a predetermined preload compression, and a plurality of centrifugal flyweights pivotally mounted on the back plate independently of the levers and arranged to swing outwardly under centrifugal force and move said ring in the spring loading direction when the driving element exceeds a predetermined speed of rotation to cause engagement of the clutch under increased spring pressure.

W. VINCENT THELANDER.

REFERENCES CITED

The following references are of record in the file of this patent:

UNITED STATES PATENTS

| Number | Name | Date |
| --- | --- | --- |
| 1,931,674 | Nutt et al. | Oct. 24, 1933 |
| 1,959,036 | Nutt | May 15, 1934 |
| 1,993,123 | Rockwell et al. | Mar. 5, 1935 |
| 2,062,484 | Timian | Dec. 1, 1936 |
| 2,218,379 | Evans | Oct. 15, 1940 |
| 2,326,279 | Banker | Aug. 10, 1943 |
| 2,444,964 | Thelander | July 13, 1948 |